United States Patent [19]

Chiba et al.

[11] Patent Number: 5,244,484
[45] Date of Patent: Sep. 14, 1993

[54] PROCESS FOR PRODUCING A CURVED GLASS PLATE PARTIALLY COATED WITH A CERAMIC

[75] Inventors: Jiro Chiba; Tsuneo Manabe, both of Yokohama, Japan

[73] Assignee: Asahi Glass Company, Ltd., Tokyo, Japan

[21] Appl. No.: 951,337

[22] Filed: Sep. 25, 1992

Related U.S. Application Data

[63] Continuation of Ser. No. 679,230, Apr. 2, 1991, abandoned.

[30] Foreign Application Priority Data

Apr. 3, 1990 [JP] Japan ................. 2-87371

[51] Int. Cl.$^5$ ............................................. C03G 23/02
[52] U.S. Cl. ................................... 65/24; 65/60.5; 65/60.53; 65/106; 65/33; 501/15; 501/17; 501/74; 501/75
[58] Field of Search .................. 65/33, 60.5, 60.53, 65/24, 106; 501/15, 17, 74, 75

[56] References Cited

U.S. PATENT DOCUMENTS

| | | |
|---|---|---|
| 3,663,244 | 5/1972 | Martin . |
| 3,787,218 | 1/1974 | Dietz ........................ 501/15 |
| 3,961,120 | 6/1976 | Hearn et al. . |
| 4,058,387 | 11/1977 | Nofziger ..................... 501/15 |
| 4,339,257 | 7/1982 | Ueda ........................ 65/24 |
| 4,596,590 | 6/1986 | Boaz ........................ 65/24 |
| 4,618,538 | 10/1986 | Emonts ..................... 65/60.5 |
| 4,822,396 | 4/1989 | Reinherz et al. . |

FOREIGN PATENT DOCUMENTS

| | | |
|---|---|---|
| 0068565 | 1/1983 | European Pat. Off. ........ 501/74 |
| 201241 | 12/1986 | European Pat. Off. . |
| 377062 | 7/1990 | European Pat. Off. . |
| 1596770 | 2/1971 | Fed. Rep. of Germany . |
| 2072159 | 9/1981 | United Kingdom . |

OTHER PUBLICATIONS

Webster's New World Dictionary, 1988, 3rd Ed., Simon & Schuster p. 547.
Patent Abstracts of Japan, vol. 11, No. 268, (C-444) [2715] Aug. 29, 1987, & JP-A-62 072 545.

*Primary Examiner*—W. Gary Jones
*Assistant Examiner*—John Hoffmann
*Attorney, Agent, or Firm*—Oblon, Spivak, McClelland, Maier & Neustadt

[57] ABSTRACT

A process for producing a curved glass plate, which comprises coating a crystallizable ceramic color composition to a predetermined portion of a glass plate, followed by baking at a temperature of from 500° to 620° C. to fuse the ceramic color composition to the glass plate, then crystallizing the fused ceramic color composition at a temperature of from 600° to 700° C., followed by bend-shaping by a pressing apparatus in a furnace.

5 Claims, No Drawings

PROCESS FOR PRODUCING A CURVED GLASS PLATE PARTIALLY COATED WITH A CERAMIC

This application is a continuation of application Ser. No. 07/679,230, filed on Apr. 2, 1991, now abandoned.

The present invention relates to a process for producing a curved glass plate.

Heretofore, a so-called automobile ceramic color paste has been widely used which is baked along the periphery or at the center portion of a window glass of an automobile by a process which comprises preparing a paste of a ceramic color composition, screen-printing it along the periphery or at the center of the automobile window glass and drying it, followed by baking in a bend-shaping step.

Such a ceramic color paste is used for such a purpose that when baked along the window glass periphery, it forms a colored opaque layer to prevent degradation of a urethane sealant by ultraviolet rays or to prevent heating wire terminals from being seen from outside. As a composition for such a purpose, it is known to employ the one prepared by mixing various heat resistant coloring pigments to non-crystalline glass as the base material. As such glass, there is, for example, the one disclosed in Japanese Unexamined Patent Publication No. 160845/1989 which comprises 53.24 wt % of PbO, 30.73 wt % of $SiO_2$, 0.68 wt % of $ZrO_2$, 3.13 wt % of $Al_2O_3$, 9.66 wt % of $B_2O_3$ and 2.56 wt % of CdO. On the other hand, in recent years, the bend-shaping method for automobile window glass has been changing in its production mode to a system called a DBO Method wherein bend-shaping is conducted in a pressing machine provided in heating furnace for the purpose of improving the productivity and the precision of bend-shaping.

When a commercially available conventional ceramic color paste is used for such a DBO Method, the ceramic color composition tends to adhere to the pressing mold (heat resistant cloth such as glass cloth is usually provided on the surface of the pressing mold), whereby so-called mold release characteristics tend to be poor and the productivity will accordingly be low. On the other hand, as a method for improving the mold release characteristics, it is effective to apply a mold release agent to the surface of the ceramic color composition or to the surface of the pressing mold. However, this creates problems from the aspects of an increase in the number of process steps and an additional cost for the mold release agent.

It is an object of the present invention to overcome the above problems of the prior art and to provide a process for producing a curved glass plate wherein a ceramic color composition excellent in mold release characteristics is employed.

The present invention provides a process for producing a curved glass plate, which comprises coating a crystallizable ceramic color composition to a predetermined portion of a glass plate, followed by baking at a temperature of from 500° to 620° C. to fuse the ceramic color composition to the glass plate, then crystallizing the fused ceramic color composition at a temperature of from 600° to 700° C., followed by bend-shaping by a pressing apparatus in a furnace.

More specifically, the present invention provides a process for producing a curved glass plate, which comprises fusing a ceramic color composition to a predetermined portion of a glass plate and crystallizing it, followed by bend-shaping by a pressing apparatus in a furnace, wherein the ceramic color composition comprises an inorganic component consisting essentially of from 5 to 30 wt % of a heat resistant coloring pigment powder, from 70 to 95 wt % of a crystallizable glass powder and from 0 to 10 wt % of a refractory filler powder, said crystallizable glass powder comprising from 13 to 29 wt % of $SiO_2$, from 0.1 to 5 wt % of $Al_2O_3+La_2O_3$, from 50 to 75 wt % of PbO, from 4 to 20 wt % of $TiO_2+ZrO_2+SnO_2$, from 0 to 6 wt % of $B_2O_3$, from 0 to 5 wt % of $Li_2O+Na_2O+K_2O$, from 0 to 5 wt % of $MgO+CaO+SrO+BaO$, from 0 to 5 wt % of $P_2O_5$ and from 0 to 2 wt % of F.

Now, the present invention will be described in detail with reference to the preferred embodiments.

The ceramic color composition to be used in the process for producing a curved glass plate of the present invention comprises a glass powder and a pigment to be crystallized and fused to a glass plate by heating, as the main components and has an organic vehicle incorporated thereto and formed into a paste. The inorganic component of such a ceramic color composition may be of any type so long as it can be fused to a usual soda lime silica glass plate at a temperature of from 500° to 620° C. and which can be crystallized at a temperature of from 600° to 700° C. Specifically the one described hereinafter is preferred.

As the organic vehicle, the one obtained by dissolving a commonly employed polymer such as ethyl cellulose, an acrylate resin, a styrene resin or a phenol resin in a solvent such as α-terpineol, butylcarbitol, an acetate or a phthalic acid ester, may be used.

Further, as the glass plate, a soda lime silica glass plate commonly employed for window glass, is used.

Such a ceramic color composition is applied, for example, along the periphery in the case of e.g. a front glass for automobile.

Then, the glass plate coated with such a ceramic color composition is continuously introduced into a heating furnace, whereby the ceramic color composition is fused to the glass plate at a temperature of from 500° to 620° C. If this temperature is lower than 500° C., the chemical resistance of the ceramic color composition tends to be low, such being undesirable. On the other hand, if it exceeds 620° C., the strength of fusion to the glass plate tends to be low, and the desired color tends to be hardly obtainable. The time required for this fusion is from 20 seconds to a few minutes.

Then, the glass plate is heated to a temperature of from 600° to 700° C. to crystallize the fused ceramic color composition. If this temperature is lower than 600° C., viscous flow tends to be inadequate, whereby the strength of fusion to the glass plate tends to be low, such being undesirable. On the other hand, if it exceeds 700° C., when the glass plate is bend-shaped by the pressing apparatus, the ceramic color composition tends to fuse to the mold, such being undesirable.

Then, the glass plate is bend-shaped by a pressing apparatus provided in a furnace at a temperature of from 640° to 710° C. according to a usual method. The mold of this pressing apparatus is covered with glass fiber cloth, and the glass plate is pressed with this cloth interposed. As the glass fiber cloth, cloth of E-glass is used, and the type of weave may be twill weave, leno weave, satin weave or mock lenoweave.

On the other hand, the mold has a curved shape corresponding to the curved shape of the desired curved glass plate, and as its material, stainless steel may preferably be employed.

Now, the ranges of the components of the ceramic color composition suitable for the production of a window glass of vehicles and the reasons for specifying them will be described.

In the inorganic component, if the content of the heat resistant coloring pigment powder is less than 5 wt %, the desired color density will not be obtained. On the other hand, if it exceeds 30 wt %, the glass content tends to be so small that fusion can not adequately be attained at a desired temperature. It is preferably from 7 to 28 wt %.

Such pigment includes, for example, the one composed mainly of magnetite, the one composed mainly of an oxide of iron and manganise and the one composed mainly of an oxide of copper and chromium.

The reasons for specifying the ranges of the components of the composition of the crystallizable glass powder are as follows.

$SiO_2$: This is a glass network former and is essential for controlling the chemical, thermal and mechanical properties. If this component is less than 13 wt %, the chemical durability tends to be poor, such being undesirable. If it exceeds 29 wt %, the glass softening point tends to be too high to attain adequate fusion to the glass surface at a desired bend-shaping temperature. It is preferably from 15 to 27 wt %.

$Al_2O_3 + La_2O_3$: These components are essential for improving the chemical durability. If the amount is less than 0.1 wt %, no adequate effects can be obtained. If the amount exceeds 5 wt %, the glass softening point tends to be too high to attain adequate fusion at a desired temperature. It is preferably from 0.5 to 4 wt %.

PbO: This component is essential as a flux component and as a component for crystallization. If the amount is less than 50 wt %, the glass softening point tends to be too high, such being undesirable. If the amount exceeds 75 wt %, the chemical durability tends to be poor, such being undesirable. It is preferably from 52 to 73 wt %.

$TiO_3 + ZrO_2 + SnO_2$: These components are essential for improving the crystallization and the chemical durability. If the amount is less than 4%, no crystallization can be attained within a desired temperature range, such being undesirable. If the amount exceeds 20 wt %, devitrification takes place during glass melting, such being undesirable. The amount is preferably from 6 to 18 wt %.

$B_2O_3$: This is not an essential component, but may be incorporated up to 6 wt % as a flux component. If the amount exceeds 6 wt %, the chemical durability tends to be poor such being undesirable. A crystallizable glass powder containing no substantial amount of $B_2O_3$ is particularly preferred, since no fusion to the mold will then take plate within a wide temperature range.

$Li_2O + Na_2O + K_2O$: These components are not essential components, but may be incorporated in an amount of up to 5 wt % as flux components. If the amount exceeds 5 wt %, the heat expansion coefficient tends to be large, such being undesirable.

$MgO + CaO + SrO + BaO$: These components are not essential components, but may be incorporated in an amount of up to 5 wt % for the purpose of improving the solubility and controlling the heat expansion coefficient. If the amount exceeds 5 wt %, the chemical durability tends to be poor.

$P_2O_5$: This component may be incorporated in an amount of up to 5 wt % for the purpose of improving the chemical durability (particularly the acid resistance). If the amount exceeds 5 wt %, devitrification is likely to take place during glass melting, such being undesirable.

F: This component may be incorporated in an amount of up to 2 wt % for the purpose of improving the chemical durability (particularly the acid resistance). If the amount exceeds 2 wt %, devitrification is likely to take place during glass melting, such being undesirable.

Such a glass powder is a crystallizable glass which precipitates large amounts of lead titanate and lead silicate as main crystals in a temperature range of from 570° to 700° C. Such a temperature range corresponds to the temperature range for bend-shaping soda lime silica glass which is useful for window glass of vehicles. Therefore, when the above crystallizable glass powder is coated to a desired portion of a glass plate, and the glass plate is heated for bend-shaping, the glass powder will be crystallized, and the apparent viscosity will be high, whereby it does not adhere to the pressing mold.

Further, a heat resistant refractory filler powder may be incorporated in an amount within a range of from 0 to 20 wt % for the purpose of controlling the heat expansion coefficient or controlling the fluidity. If the amount exceeds 20 wt %, the glass content tends to be too small to attain adequate fusion at a desired temperature.

As such a refractory filler powder, α-alumina, α-quartz, zircon cordierite or forsterite, may, for example, be mentioned.

Further, a metal oxide or a boride may be incorporated in an amount within a range of from 0 to 10 wt % as a coloring agent or a mold release agent. If it exceeds 10 wt %, the glass content tends to be too small to attain adequate fusion at a desired temperature. As the metal constituting such a compound, Ni, Sn, Ti, Mn, Fe, Cu, Ag, La, Zr, Co, Mo, Cr or Ce may, for example, be mentioned. The average particle sizes of the powders of the above materials are preferably within a range of from 0.1 μm to 10 μm. A powder having an average particle size of less than 0.1 μm is substantially poor in the productivity and tends to be expensive, such being undesirable. If the average particle size is larger than 10 μm, the screen-printing property of the paste tends to be poor, such being undesirable. More preferably, the average particle size is within a range of from 1 μm to 6 μm.

Now, the present invention will be described in further detail with reference to the Examples. However, it should be understood that the present invention is by no means restricted to such specific Examples.

EXAMPLES 1 TO 7 AND COMPARATIVE EXAMPLES A AND C

Starting materials were prepared and mixed to obtain a glass composition as identified in Table 1 and melted and vitrified at a temperature of 1,400° C. to 1,500° C. under uniform stirring. Then, the molten glass was pulverized in water or formed into flakes, and then further pulverized by e.g. a ball mill to obtain a powder. Mixing of the crystallizable glass and the heat resistant coloring pigment or filler may be conducted by a method wherein such mixing is conducted at the same time as the pulverization of the glass, or by a method wherein the glass is pulverized alone, and the mixing is conducted at the time of preparing a paste.

The coating on the glass plate is usually conducted by screen-printing. Accordingly, the powder is required to be formed into a paste by means of an organic vehicle. As such an organic vehicle, the one obtained by uniformly dissolving a common organic polymer resin such as ethyl cellulose, an acrylate resin, a styrene resin or a phenol resin in a solvent such as α-terpineol, butyl-carbitol acetate or a phthalic acid aster, is used.

The paste was prepared by a well known method i.e. by a method which comprised rough kneading, followed by uniform dispersion by means of a three roll mill to obtain a desired paste viscosity. The paste thus obtained was screen-printed on a glass plate, followed by drying, and the glass plate was introduced into a furnace with an atmosphere of from about 600° to 700° C., and baking to fuse the ceramic color composition to a glass plate was conducted and at the same time pressing of a pressing mold to the glass plate was conducted for bend-shaping of the glass plate, whereupon mold release characteristics were evaluated. As the ceramic color material which was fused to a glass plate and which did not adhere to the pressing mold, the one according to the present invention is better as shown in the Table. As Comparative Examples, conventional products were tested simultaneously and the results are shown also in the Table. However, as shown in the Table, they were inferior i.e. they adhered to the pressing mold.

The methods evaluating the properties shown in the Table and the evaluation standards were as follows.

Crystallization temperature: The peak temperature for crystallization according to DTA.

Acid resistance: A sample was immersed in a 0.1N $H_2SO_4$ solution at room temperature for 24 hours, whereupon the change of the surface condition was visually evaluated. The one having no change observed was identified by ◯ (good), the one having a slight change observed was identified by Δ (fair), and the one having a distinct color change or pealing observed was identified by × (inferior).

Heat expansion coefficient: The expansion coefficient of a sintered product obtained by baking at 650° C. for minutes is shown.

Mold release characteristics: A colored ceramic color paste was printed by screen-printing on a glass plate having a thickness of 5 mm and dried at 20° C. for 15 minutes. Then, the glass plate was directly introduced into a furnace of 700° C. and a pressing mold was pressed against it for 3 minutes under a pressure of about 1 kg/cm². This pressing mold was made of stainless steel, and its surface was covered with E-glass cloth. Then, the case where the colored ceramic color composition did not adhere to the pressing mold was identified by ◯ (good), the case where the composition adhered to the pressing mold was identified by × (inferior). Further, ⊚ indicates the case where the ceramic composition did not adhere to the pressing mold at all even when the same test was conducted by varying the furnace temperature within a range of from 670° to 730° C.

TABLE 1

| | Examples | | | | | | | Comparative Examples | | |
|---|---|---|---|---|---|---|---|---|---|---|
| | 1 | 2 | 3 | 4 | 5 | 9 | 7 | A | B | C |
| 1. Glass composition (wt %) | | | | | | | | | | |
| $SiO_2$ | 15 | 22 | 27 | 18 | 18 | 22 | 25 | 30 | 25 | 12 |
| $Al_2O_3$ | 4 | 1 | 0.5 | 2 | 2 | 2 | 2 | 6 | 3 | 1 |
| $La_2O_3$ | 0 | 3 | 0 | 0 | 0 | 0 | 0 | 0 | 0 | 0 |
| PbO | 72 | 63 | 52 | 70 | 68 | 56 | 63.5 | 50 | 55 | 0 |
| $TiO_2$ | 5 | 5 | 10 | 9 | 9 | 11 | 7 | 0 | 0 | 2 |
| $ZrO_2$ | 0 | 5 | 3 | 0 | 0.5 | 6 | 3 | 0 | 2 | 0 |
| $SnO_2$ | 1 | 0 | 0.5 | 0.5 | 0 | 0.5 | 0.5 | 0 | 1 | 1 |
| $B_2O_3$ | 0 | 0 | 5 | 0 | 0 | 2.5 | 0 | 10 | 8 | 20 |
| $Li_2O$ | 0 | 0 | 1 | 0 | 0 | 0.5 | 0 | 0 | 0 | 1 |
| $Na_2O$ | 0 | 0 | 0 | 0.5 | 0 | 1.5 | 0 | 0 | 1 | 0 |
| $K_2O$ | 21 | 0.5 | 0 | 0 | 0 | 0 | 0 | 1 | 2 | 0 |
| MgO | 0 | 0 | 0 | 0 | 0 | 0 | 0 | 0 | 0 | 0 |
| CaO | 0 | 0 | 0 | 0 | 2 | 0 | 0 | 3 | 0 | 0 |
| SrO | 0 | 0 | 1 | 0 | 0 | 0 | 0 | 0 | 0 | 0 |
| BaO | 1 | 0 | 0 | 0 | 0 | 0 | 0 | 0 | 2.5 | 8 |
| $P_2O_5$ | 0 | 0 | 0 | 0 | 0.5 | 0 | 0 | 0 | 0 | 0 |
| F | 0 | 0.5 | 0 | 0 | 0 | 0 | 0 | 0 | 0.5 | 0 |
| ZnO | 0 | 0 | 0 | 0 | 0 | 0 | 0 | 0 | 0 | 55 |
| 2. Blend ratio (wt %) | | | | | | | | | | |
| Glass | 70 | 75 | 92 | 88 | 78 | 88 | 79 | 75 | 70 | 75 |
| Pigment | 25 | 25 | 8 | 7 | 20 | 12 | 18 | 20 | 30 | 25 |
| Filler (material) | 5 (alumina) | 0 | 0 | 5 (zircon) | 2 (zircon) | 0 | 3 (alumina) | 5 (alumina) | 0 | 0 |
| 3. Properties | | | | | | | | | | |
| Crylstallization temp. | 680° C. | 650° C. | 690° C. | 650° C. | 620° C. | 630° C. | 650° C. | | | 650° C. |
| Acid resistance | ◯ | ◯ | ◯ | ◯ | ◯ | ◯ | ◯ | × | ◯ | × |
| Heat expansion coefficient (× $10^{-7}$/°C.) | 85 | 83 | 82 | 85 | 87 | 85 | 84 | 65 | 83 | 70 |
| Mold release property | ⊚ | ⊚ | ◯ | ⊚ | ⊚ | ◯ | ⊚ | × | × | × |

As described in the foregoing, the present invention provides a process for producing a curved glass plate excellent in the productivity, whereby the ceramic composition does not adhere to the mold during the bend-shaping. Such a process is suitable particularly for producing a window glass for vehicles.

We claim:

1. A process for producing a curved glass plate, which comprises fusing a ceramic color coating to a predetermined portion of a glass plate and devitrifying it, followed by bend-shaping by a pressing apparatus in a furnace, wherein the ceramic color coating comprises an inorganic component consisting essentially of from 5 to 30 wt % of a coloring pigment powder, from 70 to 95 wt % of a substantially homogeneous crystallizable glass powder and from 0 to 10 wt % of a refractory filler powder, said substantially homogenous crystallizable glass powder comprising from 13 to 29 wt % of $SiO_2$, from 0.1 to 5 wt % of $Al_2O_3+La_2O_3$, from 50 to 75 wt % of PbO, from 4 to 20 wt % of $TiO_2+ZrO_2+SnO_2$, from 0 to 6 wt % of $B_2O_3$, from 0 to 5 wt % of $Li_2O+Na_2O+K_2O$, from 0 to 5 wt % of $MgO+CaO+SrO+BaO$, rom 0 to 5 wt % of $P_2O_5$ and from 0 to 2 wt % of F.

2. The process according to claim 1, wherein said substantially homogenous crystallizable glass powder contains no substantial amount of $B_2O_3$.

3. The process according to claim 1, wherein said ceramic color coating comprises from 5 to 30% by weight of the coloring pigment powder, from 70 to 90 wt % of the substantially homogenous crystallizable glass powder and from 0 to 10% by weight of the refractory filler powder, said glass powder comprising from 13 to 29 wt % of $SiO_2$, from 0.1 to 5 wt % of $Al_2O_3+La_2O_3$, from 50 to 75 wt % of PbO, from 4 to 20 wt % of $TiO_2+ZrO_2+SnO_2$, from 0 to 6 of $B_2O_3$, from 0 to 5 wt % of $Li_2O+Na_2O+K_2O$, from 0 to 5 wt % of $MgO+CaO+SrO+BaO$, from 0 to 5 wt % of $P_2O_5$ and from 0 to 2 wt % of F.

4. The process according to claim 3, wherein said glass powder contains no substantial amount of $B_2O_3$.

5. The process of claim 1, wherein said bend-shaping step is conducted at a temperature of 640°–710° C.

* * * * *